United States Patent [19]
Diamantides

[11] 3,748,042
[45] July 24, 1973

[54] DIRECT-GRADIENT OPTICAL IMAGE CORRELATION APPARATUS

[75] Inventor: Nicholas D. Diamantides, Cuyahoga Falls, Ohio

[73] Assignee: Goodyear Aerospace Corporation, Akron, Ohio

[22] Filed: June 1, 1971

[21] Appl. No.: 148,359

Related U.S. Application Data

[63] Continuation-in-part of Ser. No. 592,532, Nov. 7, 1966, Pat. No. 3,609,762.

[52] U.S. Cl. .............................................. 356/163
[51] Int. Cl. ............................................ G01b 11/00
[58] Field of Search ..................... 356/2, 163, 164, 356/202, 203

[56] References Cited
UNITED STATES PATENTS

| | | | |
|---|---|---|---|
| 3,246,560 | 4/1966 | Birbaum et al. | 356/2 |
| 2,679,636 | 5/1954 | Hillyer | 356/2 |
| 3,202,042 | 8/1965 | Jamieson et al. | 356/203 |

*Primary Examiner*—William L. Sikes
*Attorney*—J. G. Pere and L. A. Germain

[57] ABSTRACT

An electronic system for achieving correlation and matching information between two similar optical displays without mechanically or electronically nutating or moving one display relative to the other. The system developes from each display a series of voltage signals which are highly informative of the display elements. The voltage signals from one display are summed according to a schedule established by the other display to obtain a differential signal which is scaled to determine the direction and amount of position or offset error between the two displays. One display may be a live image of a target area while the second display is a reference image of the same area.

8 Claims, 11 Drawing Figures

PATENTED JUL 24 1973
3,748,042
SHEET 1 OF 2
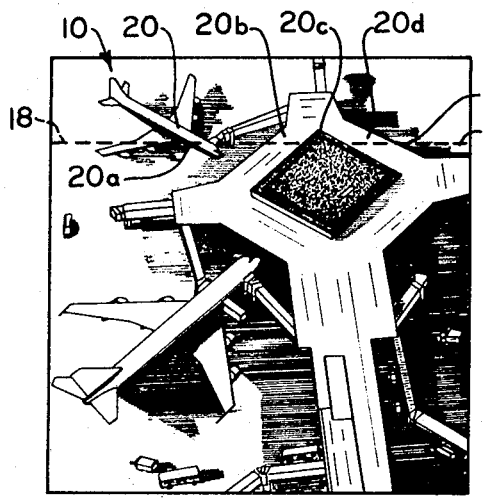
FIG.-1a
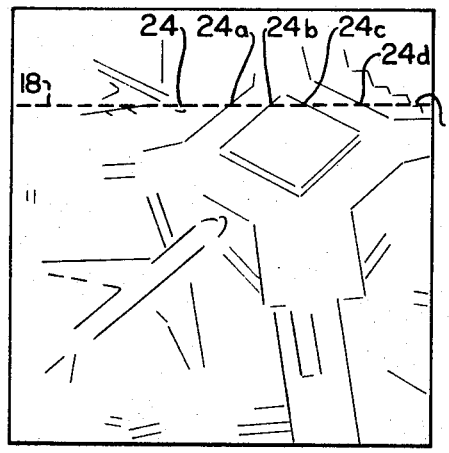
FIG.-1b
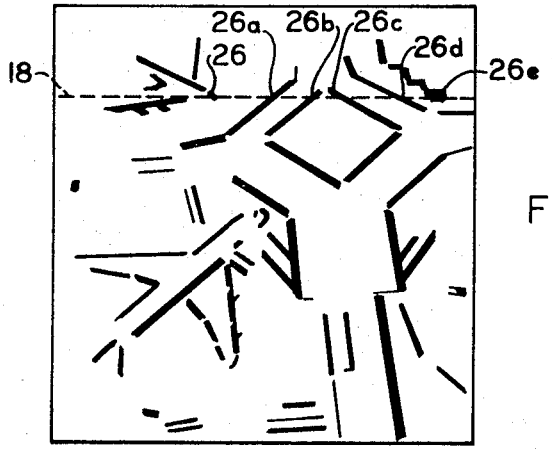
FIG.-1c
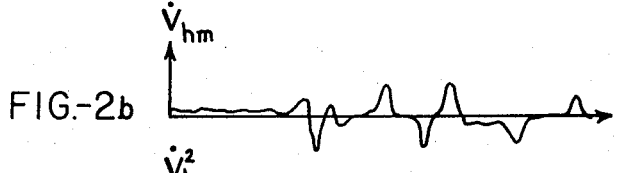
FIG.-2a
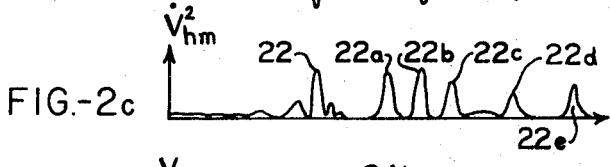
FIG.-2b
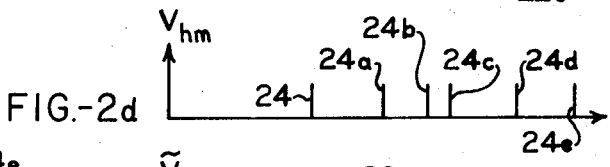
FIG.-2c
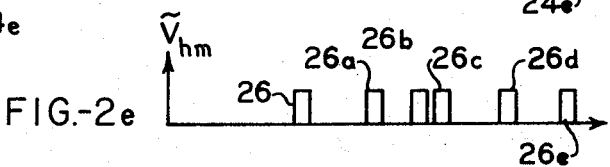
FIG.-2d
FIG.-2e
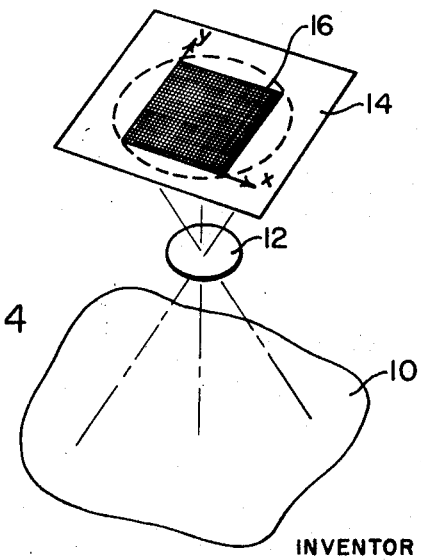
FIG.-4
INVENTOR
NICHOLAS D. DIAMANTIDES
BY
Oldham & Oldham
ATTORNEYS

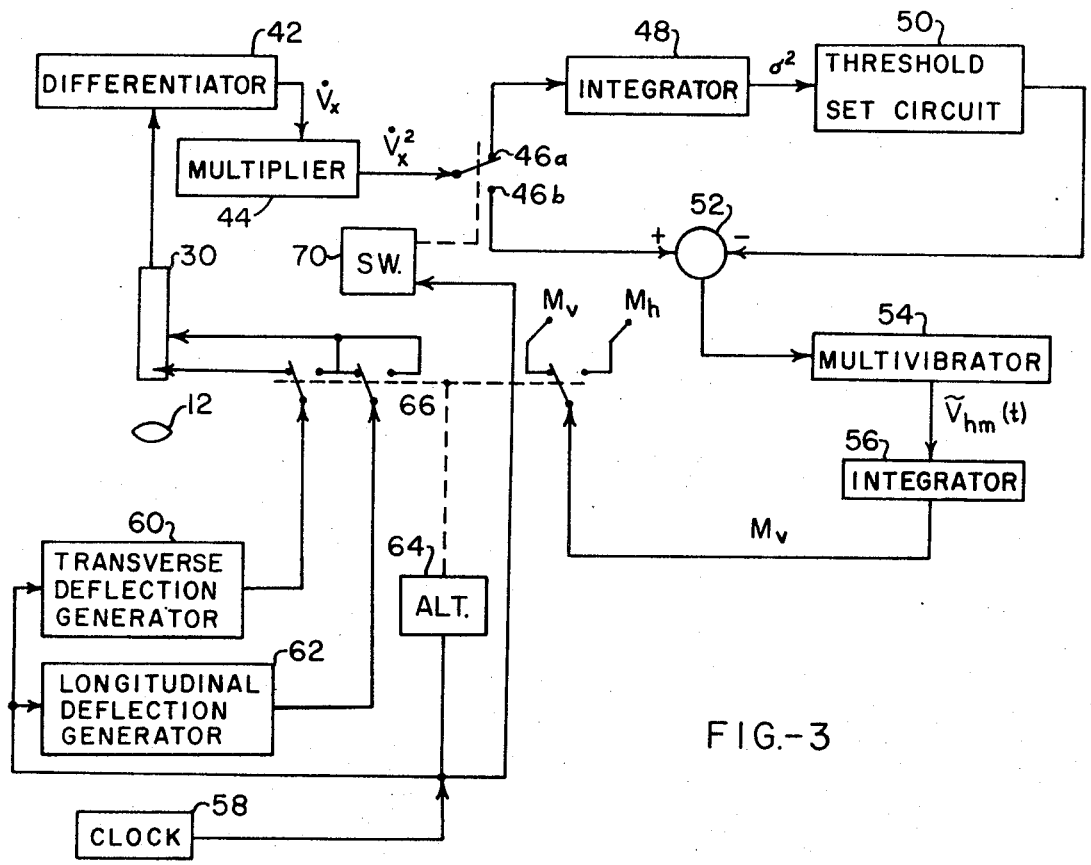
FIG.-3
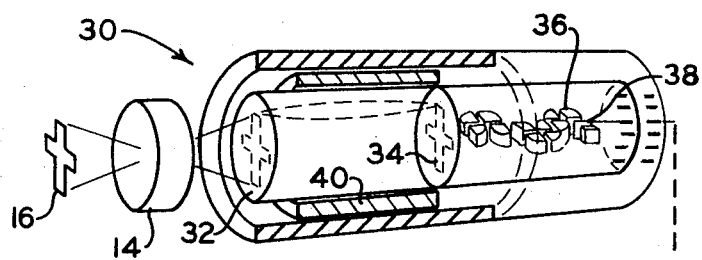
FIG.-5
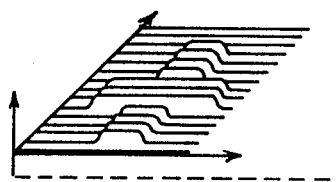
INVENTOR
NICHOLAS D. DIAMANTIDES

DIRECT-GRADIENT OPTICAL IMAGE CORRELATION APPARATUS

This application is a continuation-in-part application of Ser. No. 592,532, filed Nov. 7, 1966 for DIRECT GRADIENT-CORRELATION APPARATUS, now U.S. Pat. No. 3,609,762, granted Sept. 28,1971.

The above mentioned patent discloses a system for matching or correlating a radar image with a reference image. The present invention relates to the adaptation of the techniques and system of the patent to the correlating of an optical image and a reference image.

The primary object of the present invention is the provision of a direct-gradient optical image correlation apparatus which may achieve matching between a live optical image and a reference image without the need of nutation while achieving rapid and accurate image matching.

It is also an object of the present invention to provide a direct-gradient optical image correlation system which concentrates on those elements of the live image having high informational content while disregarding the elements of the live image which are subject to variation such as seasonal or diurnal changes.

The above and other objects of the invention which will become apparent in the following detailed description are achieved by providing correlation apparatus which includes means for scanning the live image and forming a series of voltage pulses corresponding to the boundary lines between regions of high and low illumination of the live image, means to represent and store the reference image as a plurality of voltage pulses, and means to compare the live image pulse signals and the reference signal to determine the direction and amount of position or offset error between the live image and the reference image.

For a more complete understanding of the invention and the objects and advantages thereof reference should be had to the following detailed description and the accompanying drawings wherein there is shown a preferred embodiment of the invention.

In the drawing:

FIG. 1a is a pictorial view of a live image;

FIGS. 1b and 1c are diagramatic views of the live image of FIG 1a and illustrate the theory by which the voltage signal representative of the live image is generated;

FIGS. 2a – 2e are diagrams illustrating the development of the voltage signal for one line of scan across the image of FIG. 1a;

FIG. 3 is a highly schematic showing of the direct-gradient optical image correlation apparatus of the present invention;

FIG. 4 is a schematic showing of an optical imaging system; and

FIG. 5 is a pictorial view, partially in section, of a image-dissector photomultiplier employed in the system of FIG. 3.

Considering the target or live image 10, if this live image is projected by a lens or optical imaging system 12 onto a plane 14, a real image 16 of the live image is formed on the plane. This image 16 may be described by the function $I(x, y)$ where I is the measure of light intensity of the image at the point $(x, y)$. As will be described in more detail below, the function $I(x, y)$ may, by the use of a dissecting photomultiplier, be converted into a voltage signal $V(x, y)$ which is directly proportional to $I(x, y)$. FIG. 2a illustrates the value of $V(x, y)$ for one value of $y$, that of the line 18 of FIG. 1a. illustrates the value of $V(x,y)$ for one value of that of the line 18 of FIG. a. It will be noted that the live image 10 has light areas 20, 20b, 20d and 20f, which are represented as peaks in the graph of the function V since these regions are the regions of highest illumination of the real function 16. The real image also has dark or shaded regions 20a, 20c, and 20e which are represented as minimums in the graph. It should be noted that the slope of the curve of FIG. 2a is greatest at the boundaries between areas of high and low illumination. This fact is utilized by the present invention to provide a reliable correlation technique. The maximums and minimums of the derivative $\dot{V}_x(x,y)$ of $V(x,y)$ correspond to these points of greatest change and, hence, to the boundaries between adjacent light and dark regions of the live image, as shown in FIG. 2b. If the derivative is then squared, the resulting curve, as shown in FIG. 2c, will indicate the boundaries between successive light and dark or dark and light areas as peaks.

For a variety of reasons it is expedient to use only the strongest portions of the derivative of V in both the positive and negative polarities, and to reject the remainder by means of a threshold. Quite obviously such a threshold, th, cannot be absolute and universal for all cases; instead it should be dependent on the live image 10. The threshold can be defined as follows:

$$th = \lambda \sigma^2$$

where $\lambda$ = constant and $\sigma^2$ = variance of $\dot{V}_x(x,y)$. A function $_xV(t)$ can then be defined as follows:

$$_xV(t) = \Delta \text{ if } \dot{V}_x^2(x,y) - th_x > 0$$

0 otherwise.

Likewise, $$_yV(t) = \Delta \text{ if } \dot{V}_y^2(x,y) - th_y > 0$$

0 otherwise.

It is obvious that the signal $_xV(t)$ will be a train of positive pulses corresponding to the image locations of sharp boundary lines regardless of polarity. Hence, the process so far is in essence a selective edge-enhancing and accomplishes two important functions: (1) retains the signal only at image locations of high informational content, and (2) disregards polarity. The first function reduces the quantity of informational data which must be stored and shortens the time required to correlate the live reference images. The latter function eliminates the problem of polarity reversals of local image brightness. Such reversals may be due to seasonal changes of scenery or to diurnal changes of illumination. A lake, for instance, may appear either bright or dark depending on whether it reflects the sun toward or away from the sensor.

FIG. 1b illustrates the live image 10 reduced to the boundary line form. This figure illustrates the substantial reduction in information data which need be considered by the correlation apparatus.

In order to solidify picture elements which are strongest informationally while rejecting the rest and to relieve the optic picture matching from the bane of high sensitivity to scale and azimuth orientation discrepancies between the reference and live images, width enhancing of the pulses of $_xV(t)$ is employed. This is illustrated in FIG. 2e where the boundary points are indicated as pulses of a uniform width. The equivalent picture of the live image 10 is illustrated in FIG. 1c.

FIGS. 3, 4, and 5 illustrate one embodiment of the apparatus which may be employed to achieve the objects of the invention. The real image 16 formed by the imaging system 14 on the photocathode 32 of the image dissector produces an electron image which is current-density modulated according to the optical input matter. This electron image is accelerated and projected through a dissecting aperture 34, on an electron multiplier 36 and from there to an anode 38. Deflection coils 60 and 62, serve to controllably scan the electron image across the dissecting aperture 34; by the operation of the deflection coils a scan can be taken along a line in either the x or y directions across the real image 16. For example, the scan may be along the line 18 of FIG. 1a producing the output current at the anode 38 which corresponds to FIG. 2a. The image-dissector may be a commercially available unit such as a vidissector tube manufactured by ITT which employs magnetic focusing and magnetic deflection and an electron-emissive metal mesh in close proximity to the photocathode, followed by an electric-field-free focus and deflection drift space. Because the live image 10 may change rapidly a storage grid may be employed in the image-dissector to retain the real image at a particular instant and hold this image until an erasing action is taken. This version of a tube is called storage image dissector and is available commercially also. This allows the picture to be kept invarient for a time period long enough to perform the signal processing of the present invention, as discussed below. The voltage output of the image disSector 30 is differentiated by the differentiator 42. The differentiated signal is then squared by the multiplier 44. From this point the signal is subjected to two different operations taking place sequentially and initiated by the two-position electronic switch 70. The first operation takes place where the switch is in position 46a channeling the signal $\dot{V}_x^2$ to the circuit boundary that comprises the integrator 48 and the threshold setter 50. In the integrator, the signal $\dot{V}_x^2$ is averaged over the whole picture, thus producing the variance $\sigma^2$. A portion $\lambda$ of $\sigma^2$ is held in storage at the threshold setter 50 and applied to the threshold gate or comparator 52. Once this is done the second operation is initiated by the switch 70 which switches to the position 46b. As before, the transversal (horizontal) and longitudinal (vertical) deflection coils acting cooperatively scan the image in the x direction line by line regenerating the signal $\dot{V}_x^2$. Only the strong peaks of the latter are allowed by the threshold gate 52 to proceed into the single shot multivibrator 54 triggering the latter into producing a train of standard pulses as depicted by FIG. 2e. This pulse train is symbolized by $\tilde{V}_{hm}$ in FIG. 3 (hm meaning the m-th horizontal scan line), and is integrated over each scan line by the integrator 56, thus producing the m-th point of the vertical map $M_v$:

$$M_v(m\Delta y) = \int_{t_m}^{t_m+T} \tilde{V}_{hm} dt$$

Hence, $M_v$ ($m \Delta y$) represents the total number of strong boundaries crossed by the m-th scan line.

As the longitudinal (vertical) deflection coil changes the value of m, one by one the points of the linear map $M_v$ in the y direction are generated. This is exactly the map form required of maps suitable for direct-gradient map matching.

According to the direct-gradient technique, the corresponding reference map $M_v^*$ may be prepared by (a) applying the foregoing operations to a reconnaissance photo for generating a map $M_{vr}$ similar to the live map $M_v$ and (b) subjecting $M_{vr}$ to the average-level-crossing criterion of the direct-gradient technique in order to produce the reference pulse train $M_v^*$.

The technique and apparatus for performing the correlation between the live map and the reference map is illustrated and described in the above-identified patent. Reference should be had to said patent and particularly to the embodiment illustrated in FIG. 4.

Since the reference maps are pulse trains in which pulse spacing is the information carrier, and since the number of pulses in each train is relatively small, in the order of 15 pulse pairs or less, the reference map is storable in a small digital memory thus obviating the need for cumbersome electro-optical components such as photographic film, film-movement mechanisms, and projectors as well as all the necessary problems of alignment, weight and malfunction inherent in such systems. Further, the reference map may be changed remotely within milliseconds, by any form of data link with the comparator apparatus. Since the reference map is digital in nature it is highly immune from noise during read-in or read-out operations.

The operation of the system is controlled by a clock 58 which governs the transverse and longitudinal deflection generators 60 and 62, respectively for feeding the corresponding deflection coils in the image dissector 30. The clock 58 also controls an alternator 64 which operates a switch 66 for switching the operations between the x and y axes of the image and the switch 70 for switching between threshold determination and comparator operations.

The method of the present inventiOn frees the matching from the effects of clouds that may be present within the live map area. This happens because the derivative signals are quite low over cloud areas, and as such, are eliminated by the threshold. Only at the cloud edges will these signals possibly be substantial; however, by not being present in the reference, they count primarily as a low frequency additive noise, toward which the direct-gradient mapping exhibits considerable insensitivity.

The fact that the picture is scanned along lines parallel to either the x or the y axis offers a decisive tool for undoing the effects of large discrepancies due to large differences in attitude and orientation between the points at which the reference and live pictures were taken. It is obvious that an appropriate computer program can easily generate the shape of the line into which a given straight scan line should be transformed to undo such effects. Matching is therefore possible between a reference obtained vertically and a live picture obtained from a shallow trajectory or vice-versa.

It will be understood that while only the best known embodiments of the invention have been illustrated and described in detail herein, the invention is not so limited. Reference should therefore be had to the appended claims in determining the true scope of the invention.

What is claimed is:

1. Apparatus for generating a map signal from an optical image for use as an input in a gradient-based correlator, comprising:
   means for generating a signal proportional to the intensity of the optical image along at least one scan line traversing the image;
   first circuit means receiving the signal from the signal generating means and producing a signal equivalent to the arithmetically squared rate of change of the signal from the signal generating means;
   second circuit means for receiving the signal produced by the first circuit means and creating therefrom a predetermined signal level;
   third circuit means for receiving the signal produced by the first circuit means and the predetermined signal level produced by the second circuit means and producing an output signal when the signal produced by the first circuit means exceeds the predetermined signal level created by the second circuit means; and
   a first integrator for integrating the output signal from the third circuit means for each scan line to produce the map signal.

2. Apparatus according to claim 1 wherein the first circuit means comprises a differentiator receiving the signal produced by the signal generating means, and a first multiplier for squaring the output of the differentiator.

3. Apparatus according to claim 2 wherein the second circuit means comprises a second integrator receiving the output of the first multiplier, a second multiplier for multiplying the second integrator output by a constant, and storage means for retaining the output of the second multiplier and for furnishing said output to the third circuit means.

4. Apparatus according to claim 3 wherein the third circuit means comprises a comparator in series connection with a multivibrator.

5. Apparatus according to claim 1 wherein the means for generating the signal comprises an image dissector having an optical input.

6. Apparatus according to claim 5 further including means to project a real image of a live object to the optical input of the image dissector.

7. Apparatus for generating a signal representative of an optical image, comprising:
   means for scanning the optical image to produce a signal proportional to the intensity of the optical image along at least one line of scan traversing the image;
   first circuit means receiving the signal from the scanning means and producing an output pulse indcative of the squared rate of change of the signal from the scanning means;
   second circuit means responsive to the first circuit means for establishing a predetermined signal level;
   third circuit means responsive to the first and second circuit means for producing an output signal when the signal from the first circuit means exceeds the predetermined signal level of the second circuit means; and
   an integrating circuit for integrating the output pulse signal for each line of scan to produce the representative signal.

8. Apparatus according to claim 7 wherein the scanning means scans along at least two non-parallel lines each traversing the image to produce at least two signals, and further including means controlling the scanning means and the first, second, and third circuit means whereby the representative signal corresponding to each line of scan is generated successively.

* * * * *